United States Patent
Foley et al.

(10) Patent No.: US 8,576,666 B1
(45) Date of Patent: Nov. 5, 2013

(54) GRAPHICAL USER INTERFACE FOR FLOW NOISE MODELING, ANALYSIS, AND ARRAY DESIGN

(75) Inventors: Alia W. Foley, Middletown, RI (US); William L. Keith, Ashaway, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 281 days.

(21) Appl. No.: 13/134,484

(22) Filed: Jun. 6, 2011

(51) Int. Cl.
  *H04B 11/00* (2006.01)
  *G01M 9/00* (2006.01)
  *G01F 1/34* (2006.01)
  *G01V 1/40* (2006.01)

(52) U.S. Cl.
  USPC ............. 367/131; 73/147; 73/861.42; 702/13

(58) Field of Classification Search
  USPC .......................................................... 73/147
  See application file for complete search history.

(56) References Cited

U.S. PATENT DOCUMENTS

| | | | |
|---|---|---|---|
| 5,961,080 A * | 10/1999 | Sinha | 244/204 |
| 2002/0163482 A1* | 11/2002 | Sullivan | 345/6 |
| 2003/0147538 A1* | 8/2003 | Elko | 381/92 |
| 2004/0128638 A1* | 7/2004 | Kerzman et al. | 716/11 |
| 2006/0241867 A1* | 10/2006 | Kuchuk et al. | 702/13 |
| 2006/0266106 A1* | 11/2006 | Glauser et al. | 73/147 |
| 2007/0034017 A1* | 2/2007 | Winston et al. | 73/861.42 |
| 2008/0156101 A1* | 7/2008 | Henry | 73/584 |

\* cited by examiner

*Primary Examiner* — Isam Alsomiri
*Assistant Examiner* — Hovhannes Baghdasaryan
(74) *Attorney, Agent, or Firm* — Michael P. Stanley; James M. Kasischke

(57) ABSTRACT

A system is provided that employs a programmable computer on which a graphical user interface provides parametric design and analysis of pressure sensor arrays used in aero- or hydroacoustic investigations. Use of the system allows for scientific and parametric investigations of turbulent boundary layer physics, as well as iterative array design optimization. Additionally, the system including the graphical user interface facilitates comparison of the results of current models for wall pressure with past theoretical or experimental wall pressure.

6 Claims, 6 Drawing Sheets

Wall Pressure Spectra Generator

Save to file:
C:\AWFoleyWPSprediction   Open..   Make predictions

Fluid properties
Fluid [water]   density (slugs/ft^3) [1.94]   kinematic viscosity (ft^2/s) [1e-005]

Boundary layer properties
- tow velocity (ft/s): 42.5
- friction velocity (ft/s): 1.615
- boundary layer thickness (in.): 12
- displacement thickness (in.): 1.5
- momentum thickness (in.): 1.2

Sensor configuration
- # of streamwise sensors: 48
- # of spanwise sensors: 1
- sensor diameter (in.): 0.15
- streamwise spacing (in.): 0.2
- spanwise spacing (in.): 0.1

Frequency settings

|  | Min | Max | Step size | # of steps |
|---|---|---|---|---|
| frequency range (Hz) | 100 | 500 | 100 | 5 |
| dimensionless range wd*/Uo | 1.848 | 9.24 | 1.848 | |

Corcos model parameters

| | | | | | |
|---|---|---|---|---|---|
| a1 | 1 | b1 | 0.155 | b5 | 0.145 |
| a2 | -0.1445 | b2 | -0.092 | b6 | -2.916 |
| a3 | 0.1445 | b3 | 0.7 | b7 | 0.99 |
| a4 | -2.5 | b4 | -0.789 | b8 | -4 |

Chase model parameters

| | | | |
|---|---|---|---|
| b | 0.75 | ct | 0.00466 |
| hc | 3 | cm | 0.15533 |

FIG. 4

GRAPHICAL USER INTERFACE FOR FLOW NOISE MODELING, ANALYSIS, AND ARRAY DESIGN

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

None.

BACKGROUND OF THE INVENTION (1) Field of the Invention

The invention generally relates to an apparatus for performing mathematical analyses and particularly to a computer-based apparatus that provides graphical user interfaces.

(2) Description of the Prior Art

A primary limitation in acoustic array performance is flow noise induced by turbulent wall-pressure fluctuations which exist due to the moderate to high Reynolds number turbulent boundary layers on the arrays.

Methods aimed at boundary layer control are of limited effectiveness due to inherent fluid physics. Mitigation of flow noise is therefore accomplished through the mechanical design of the array.

Mechanical design is taken to include the supporting structure and the sensor specifications and configuration. Optimal mechanical design requires detailed knowledge of the turbulent boundary layer including the relevant length and time scales in the flow field. Sensor arrays are often designed to resolve particular wavenumber and frequency bandwidths. In order to assess a given design, a number of computations are required which historically have been done in an ad hoc fashion. In addition, simplifying assumptions are often made for convenience in performing the design and analysis.

Over the past thirty years, the use of boundary layer variables typically did not appear in the analysis, in part due to the fact that knowledge of the boundary layer variables is often lacking or difficult to obtain. Furthermore, high Reynolds number turbulent boundary layers in water have a wide range of energy-containing length and time scales. This range needs to be considered. However, many efforts have only focused attention on the low wavenumber portion of the pressure spectra. Though this region is clearly of interest, the dominant energy is contained in the convective ridge wavenumber region.

In addition to a detailed understanding of the turbulent boundary layer, semi-empirical models of the spectrum of the wall-pressure fluctuations are required. The solutions of these models require extensive iteration and numerical integration over frequency and wavenumber and as such can be cumbersome to utilize. Furthermore, the models (which include a limited number or no boundary layer parameters) are only approximate in nature.

The prior art includes analyses of such wall pressure fluctuations, for example as reported by W. L. Keith, et al., "A comparison of turbulent boundary layer wall-pressure spectra," Journal of Fluids Engineering, 1992, Vol. 114, pp. 338-347.

The prior art also includes the Broadside Acoustic Noise Estimation (BANE) model that was developed by Dr. Lowell Brooks. This computer code is aimed primarily at towed array self-noise analysis and contains many empirical parameters. It is not predicated on detailed knowledge of turbulent boundary layer physics. It also does not have a graphical user interface, and cannot be used for the applications of experimental wall-pressure measurements or hull arrays without significant modification.

The prior art also includes other codes aimed at flow noise analysis. With the shift in research emphasis away from flow noise, most of these codes became inactive and are now somewhat outdated and are not readily available.

Also known in the prior art is Kim et al. (U.S. Pat. No. 6,151,680) which is said to disclose a design system associated with pre-stressed concrete cylinder pipe (PCCP) using a graphic user interface (GUI), which is capable of carrying out, a variety of operations such as the design of embedded-cylinder pipe, lined-cylinder pipes, and fittings, computer-aided drawing interfaces, operations for quantity calculation, operations for inquiry to a database, and operations for a demonstration presentation, in a GUI environment; thereby, allowing for the easy use of the design system by the user.

In accordance with this operating method, it is possible to not only reduce the time taken to design the above pipes, and fittings, but also to allow the user to achieve such a design even when there is no theoretical knowledge of that design while only having knowledge of data inputting and outputting.

Also known in the prior art is Keith et al. (U.S. Pat. No. 7,130,242) which is said to disclose a system and method for detecting an acoustic signal in the presence of flow noise produced by the turbulent flow field that develops about a hosewall of a towed array. Pressure is measured with sensors at two diametrically-opposed locations at the surface of the hosewall over a period of time. The sensed pressure signals are used to generate an ensemble-averaged cross-spectra which effectively cancels out the flow noise while retaining the acoustic signal associated with a possible target of interest.

Flow-induced vibrations impact towed array reliability by causing mechanical failure of connectors and components. As such, there is a need for systems and methods that provide the ability to quickly assess the impact of design changes in acoustic arrays in order to avoid towed array failures.

SUMMARY OF THE INVENTION

It is therefore a primary objective and general purpose of the present invention to provide a systematic, stream-lined computer-based system and method to parametrically analyze flow noise.

It is a further objective of the present invention to provide a graphical user interface (GUI) that allows the system and method to be more convenient to use.

It is a still further objective of the present invention to provide a system and method that allows for independent control of design parameters.

It is a still further objective of the present invention to provide a system and method that allows variation of configuration parameters for spectral analysis of turbulent pressure fluctuations.

According to one aspect, the present invention features a computer-based apparatus for analyzing flow noise. The apparatus comprises a general purpose programmable computer configured to operate under the control of instructions recorded on a machine-readable medium. The instructions (when operating) provide a graphical user interface component and are configured to accept input data in parametric form. The graphical user interface component is configured to manipulate the input data in parametric form to a form suitable for computation, and is configured to record the input data in non-volatile form on a machine readable medium.

The input data is recorded in at least one form selected from the group consisting of the parametric form (the form suitable for computation); a computational component configured to operate in response to a command from the user; a computational component configured to accept the input data and to compute a predicted response of an acoustic sensor array to a user-defined flow field as an output, and configured to record as output data the result of the computation in non-volatile form; and a display component provided through a graphical user interface. The display component is configured to receive as input; the predicted response of the acoustic sensor array to the user-defined flow field, and to provide as output the predicted response according to instructions. The predicted response according to user-selected instructions is provided in at least one manner selected from the group consisting: of displaying the output to be viewed; recording the output for later use; and transmitting the output.

In one embodiment, the display component is additionally configured to accept input data obtained by measurement of a response of an acoustic array, and to provide as output both the predicted response and the data obtained by measurement for comparison with one another.

In another embodiment, the GUI (configured to accept system input data in parametric form) is configured: to accept data representative of fluid properties; boundary layer parameters that define a flow field; wavenumber and frequency bandwidths; semi-empirical constants used in mathematical models of the spectra of wall pressure fluctuations; and an array configuration selected from the group consisting of a one-dimensional array configuration and a two dimensional array configuration.

In yet another embodiment, the data representative of the array configuration comprises a number of sensors with the sensor spacing in the streamwise and spanwise directions, a sensor shape and a sensor length scale. In still another embodiment, the computational component is configured to perform computations according to a numerical integration mathematical process.

According to another aspect, the invention relates to a computer-based method for analyzing wall-pressure fluctuation measurements in an acoustic array. The method comprises: providing a computer configured to operate under instructions; accepting input data in parametric form from a user of the system by way of a graphical user interface component; manipulating the input data in parametric form to a form suitable for computation; recording the input data in non-volatile form on a machine readable medium, the input data recorded in at least one form selected from the group consisting of the parametric form and the form suitable for computation; computing a predicted response of an acoustic sensor array to a user-defined flow field as an output; recording as output data the result of the computation in non-volatile form; and providing the predicted response as output through a graphical user interface that accepts user-selected instructions. The predicted response is provided in at least one manner selected from the group consisting of: displaying the output to be viewed; recording the output for later use; and transmitting the output.

In one embodiment, the method further comprises the steps of: accepting as input, data obtained by measurement of a response of an acoustic array; and providing as output both the predicted response and the data obtained by measurement for comparison with one another.

In another embodiment, the step of accepting input data comprises; data representative of fluid properties, boundary layer parameters that define a flow field, wavenumber and frequency bandwidths, semi-empirical constants used in mathematical models of the spectra of wall pressure fluctuations, and an array configuration selected from the group consisting of a one-dimensional array configuration and a two-dimensional array configuration.

In yet another embodiment, the data representative of the array configuration comprises a number of sensors that are used and their spacing in the streamwise and spanwise directions, a sensor shape and a sensor length scale.

In a still further embodiment, the step of computing a predicted response comprises performing computations according to a numerical integration mathematical process.

In a still further embodiment, the step of accepting input data in parametric form comprises reading in as input data information previously recorded in an input data file.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4 is an image of a region of a computer display screen on which is displayed a Wall Pressure Spectra Generator Graphical User Interface (GUI), according to principles of the present invention;

DETAILED DESCRIPTION OF THE INVENTION

Figure 1:
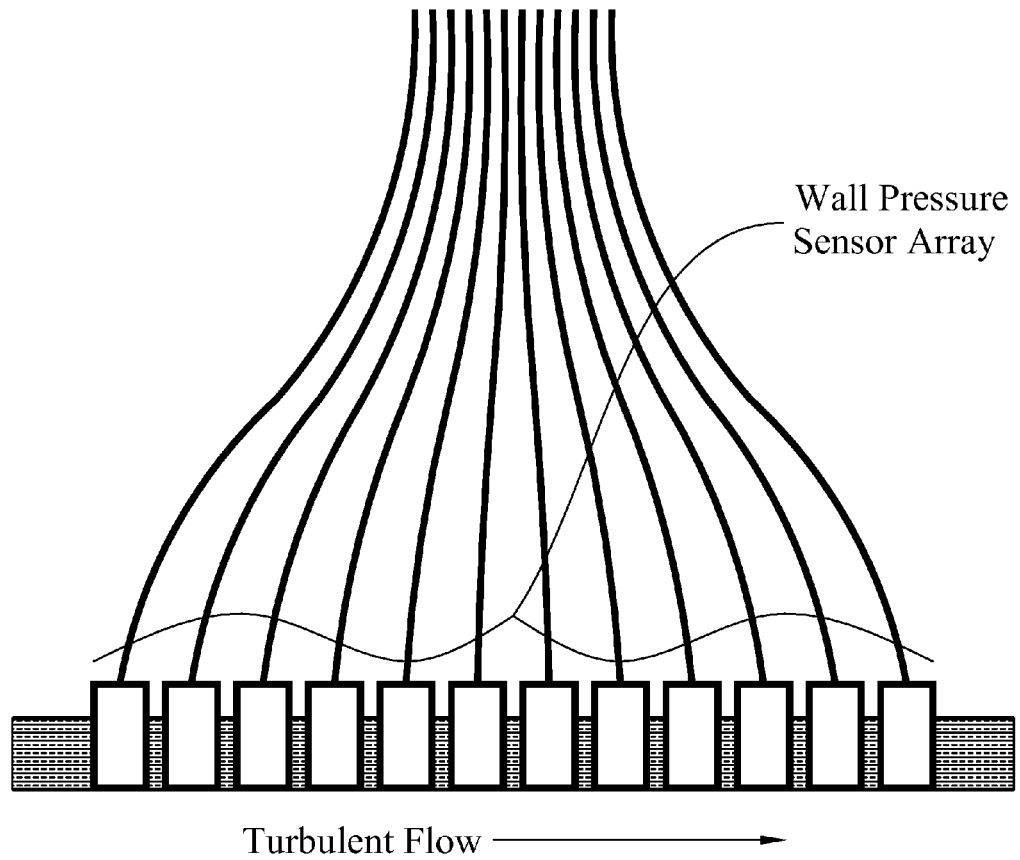
FIG. 1 is a schematic that illustrates an experimental wall pressure sensor array.

The invention provides a systematic, streamlined method to parametrically design and analyze wall-pressure fluctuation measurements. A systematic method for achieving this is to use a computer-based system that provides a graphical user interface (GUI) which allows for independent control of all design parameters and efficient computations. The benefit of this system is the ability to dynamically accommodate essential configuration parameters for spectral analysis of pressure fluctuation predictions and measurements or sensor array design optimization. These parameters include fluid properties, turbulent boundary layer properties, sensor specifications and configuration, wavenumber and frequency bandwidth settings, and parameters governing predictive models of wall pressure fluctuations.

In the embodiment described, the system uses prescribed parameters that define the flow field of interest in a mathematical process which numerically solves two integral models for pressure fluctuation spectra.

The models are based upon the models of Chase (Chase, D. M., 1987. "The Character of the Turbulent Wall Pressure Spectrum at Subconvective Wavenumbers and a Suggested Comprehensive Model," *Journal of Sound and Vibration*, 112 (1): 125-147) and of Corcos (Corcos G. M. 1963. "Resolution of pressure in turbulence," *Journal of the Acoustical Society of America*, 35(2): 192-199), which are discussed in greater detail herein below.

The system can predict an experimental measurement of the user-defined flow field by accounting for sensor array design and spatial resolution. The generated prediction for the spectrum of wall pressure fluctuations is displayed in a two-dimensional or three-dimensional plot against frequency, streamwise wavenumber, or spanwise wavenumber with English, metric, or non-dimensional units.

Multiple length and time scales are available for providing the data as nondimensional information: thereby allowing for investigations into the effectiveness of different scaling parameters and refinement of the empirical models used in making the predictions. Experimental data, such as that presented by Cipolla and Keith (Cipolla, K. M. and Keith, W. L. 2008. "Measurements of the wall pressure spectra on a full scale towed array." *Ocean Engineering*, 35: 1052-1059) and Keith and Cipolla (Keith, W. L., and Cipolla, K. M. 2010. "Features of the Turbulent Wall Pressure Field on a Long Towed Cylinder, *Experiments in Fluids*, 49:1, 203-211), can be uploaded and plotted with the predictions for direct comparison between theory and experiment.

Previous models require refinement which can only be achieved by careful incorporation of the physics of the turbulent boundary layer with parametric investigations and comparisons with experimental wall pressure measurements. A systematic method for achieving this is to use a graphical user interface (GUI) which allows for independent control of design parameters and efficient execution of the computations.

The GUI is part of a system comprising a programmable computer for predictive modeling and analysis of flow noise and flow-induced vibration. The GUI uses prescribed parameters defining the flow field of interest in a mathematical process which numerically solves two integral models for pressure fluctuations. The GUI can also be used to predict an experimental measurement of the user-defined flow field by accounting for sensor array design and spatial resolution.

The generated prediction for the spectrum of wall pressure fluctuations is displayed in a two-dimensional or three-dimensional plot against frequency, streamwise wavenumber, or spanwise wavenumber. Experimental data can also be uploaded by the user and plotted with the predictions for comparison between theory and experiment. Multiple length and time scales are available for non-dimensionalizing the data, allowing for investigations into the effectiveness of different scaling parameters and refinement of the empirical models used in making the predictions.

Modeling Wall Pressure Spectra

Corcos proposed a model for the cross-spectra of wall pressure fluctuations. The similarity scaling Corcos used has been shown to be effective for collapsing cross-spectral data over a range of Reynolds numbers in both flat plate and pipe flows. Farabee, T. M., and Casarella, M. J. 1991. "Spectral Features of Wall Pressure Fluctuations Beneath Turbulent Boundary Layers." *Physics of Fluids A*, 3:10, 2410-2420 determined the parameter ranges over which the similarity scaling was valid. Corcos' cross-spectral model can be transformed analytically in closed form to obtain a model for the wavenumber frequency spectrum. However, this transformation involves the approximation that the convection velocity is constant.

Keith, W. L., and Abraham, B. M. 1997. "Effects of Convection and Decay of Turbulence on the Wall Pressure Wavenumber-Frequency Spectrum." *Journal of Fluids Engineering*, 119, 50-55 showed that when the variation of convection velocity with spatial separation is taken into account the spectral levels at high and low wavenumbers (with respect to the convective ridge) are significantly changed. The simple, closed form analytical model obtained is therefore inadequate. Another approach taken by various investigators has been to add parameters to the cross-spectral model in an attempt to correct these levels. However, that approach is empirical and deviates from the basic model by proposed by Corcos'. Therefore, there is no closed form expression related to the cross-spectral model which is based on boundary layer physics and accurately represents the spectra.

Chase, D. M. 1987. "The Character of the Turbulent Wall Pressure Spectrum at Subconvective Wavenumbers and a Suggested Comprehensive Model," Journal of Sound and Vibration, 112 (1): 125-147 developed a semi-empirical model of the wavenumber-frequency spectra, based upon the measurements of Bull, M. K., 1967, "Wall Pressure Fluctuations Associated With Subsonic Turbulent Boundary Layer Flow," *Journal of Fluid Mechanics*, 28:4, 719-754 as well as velocity measurements in the boundary layer. This model is expressed as $$\Phi(k_x, k_z, \omega) = \frac{\rho^2 u_\tau^3}{[K_+^2 + (b\delta)^{-2}]^{5/2}} \left\{ C_T K^2 \left[ \frac{K_+^2 + (b\delta)^{-2}}{K^2 + (b\delta)^{-2}} \right] + C_M k_x^2 \right\}, \quad (1)$$

where $$K^2 = k_x^2 + k_z^2 \quad (2)$$

$$K_+^2 = \frac{(\omega - u_c k_x)^2}{(h u_\tau)^2} + K^2$$

For typical flat plate boundary layers, the recommended values for the empirical constants are h=3, b=0.75, $C_T$=0.014/h, and $C_M$=0.466/h.

Measurement and Sensor Response

Wall pressure fluctuations are typically measured with an array of piezoelectric pressure sensors that are flush mounted at the fluid-solid interface of a turbulent boundary layer flow, as shown in FIG. 1. The sensors are tightly spaced to maximize the range of unaliased measureable wavenumbers. The overall aperture length determines the resolution in wavenumber (or, equivalently, the bin width in wavenumber).

An array to measure wall pressure is typically short in aperture, with small, tightly spaced pressure sensors; while an acoustic array is long in aperture with larger, sparsely spaced acoustic sensors. The requisite scale difference between acoustic and wall pressure measurements is illustrated in FIG. 2A and FIG. 2B.

Figure 2A:
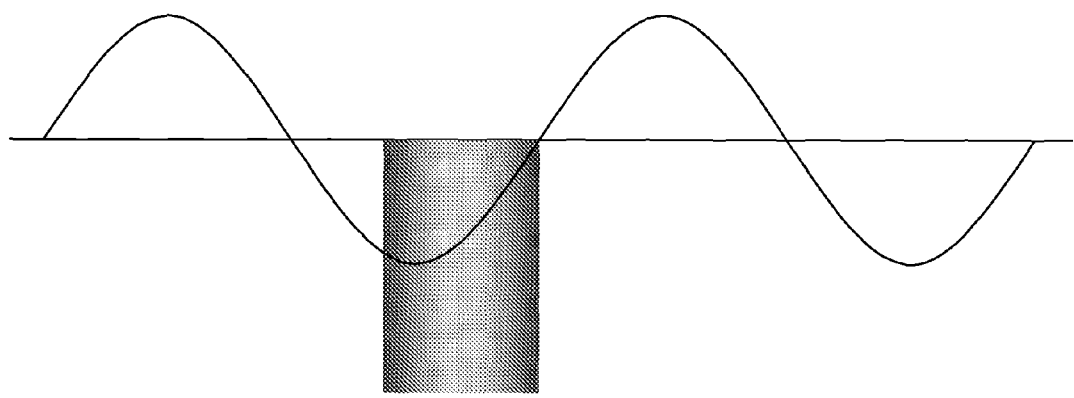
FIG. 2A is a diagram that provides a comparison of acoustic wavelengths relative to sensor size.
Figure 2B:
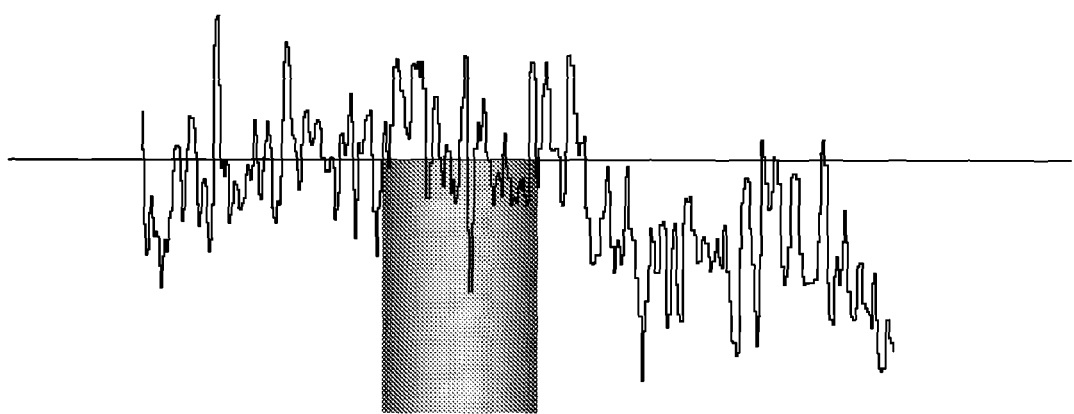
FIG. 2B is a diagram that provides a comparison of turbulent wall pressure wavelengths relative to sensor size.

As shown in FIG. 2A, acoustic wavelengths are typically long compared to the size of the sensors, and therefore easily resolved and captured. As shown in FIG. 2B, turbulent wall pressure wavelengths are small compared with sensor size;

thereby, resulting in averaging effects in the measurement of the turbulent energy distributed across the transducer face. In order to compare the autospectra from different investigations, the effects of spatial averaging must be taken into account. For measurements at moderate to high Reynolds numbers in water; the effects can be significant at higher frequencies.

For a circular pressure sensor of uniform sensitivity and a radius "r"; the relationship between the measured and true wavenumber-frequency spectra, $\Phi_m(k_x,k_z,\omega)$ and $\Phi_t(k_x,k_z,\omega)$, respectively, is given as $$\Phi_m(k_x,k_z,\omega)=\Phi_t(k_x,k_z,\omega)H_r(k_x,k_z) \quad (3)$$

wherein the sensor response $H_r(k_x,k_z)$ is assumed to be instantaneous in time and is given by $$H_r(k_x,k_z)=(2J_1(kr)/kr)^2, \quad (4)$$

wherein $J_1$ is a first-order Bessel function of the first kind, $k_x$ and $k_z$ are streamwise and spanwise wavenumber, and $\omega$ is angular frequency.

Figure 3:
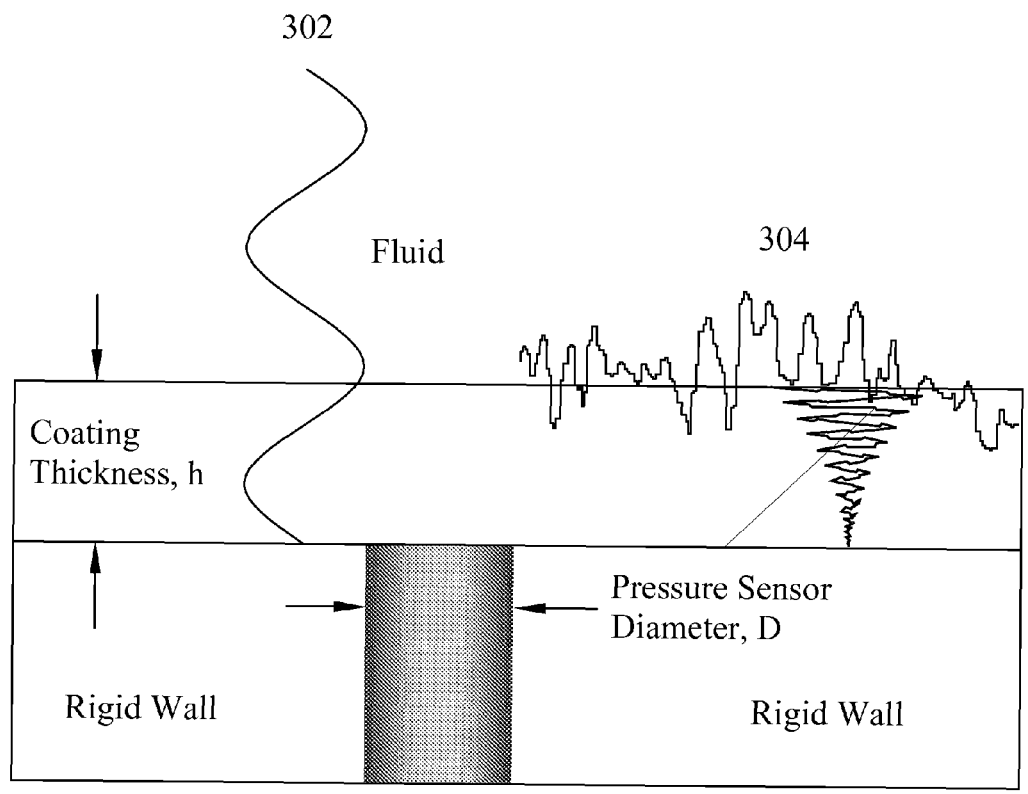
FIG. 3 is a diagram that illustrates the effect of standoff between a pressure sensor and a turbulent boundary layer.

Another important consideration when comparing the results of various investigations is standoff effect. Standoff effect refers to the attenuation of turbulent wall pressure fluctuations over a material (such as a polymeric coating) which separates the pressure transducer from the turbulent boundary layer fluid-solid interface. This concept is illustrated in FIG. 3, where a wave 302 having an acoustic wavelength passes through a polymer coating in substantially undisturbed manner; while a wave 304 having turbulent wall pressure characteristics is strongly attenuated in the polymeric coating layer.

Using the Wall Pressure Spectra Generator (GUI)

Using the GUI (shown in FIG. 4) the user supplies the fluid properties and boundary layer parameters defining the flow field. The user also prescribes the wavenumber and frequency bandwidths of interest and the semi-empirical constants used in the mathematical models for the pressure fluctuations. To predict a sensor array response to the prescribed flow field; the user may also define a one-dimensional or two-dimensional array configuration (number of sensors and spacing in the streamwise and spanwise directions) and sensor specifications (shape and length scale). When the desired parameters have been entered, the user activates the "Make Predictions" button which executes the numerical integration mathematical process; thereby generating the predictions.

Figure 5:
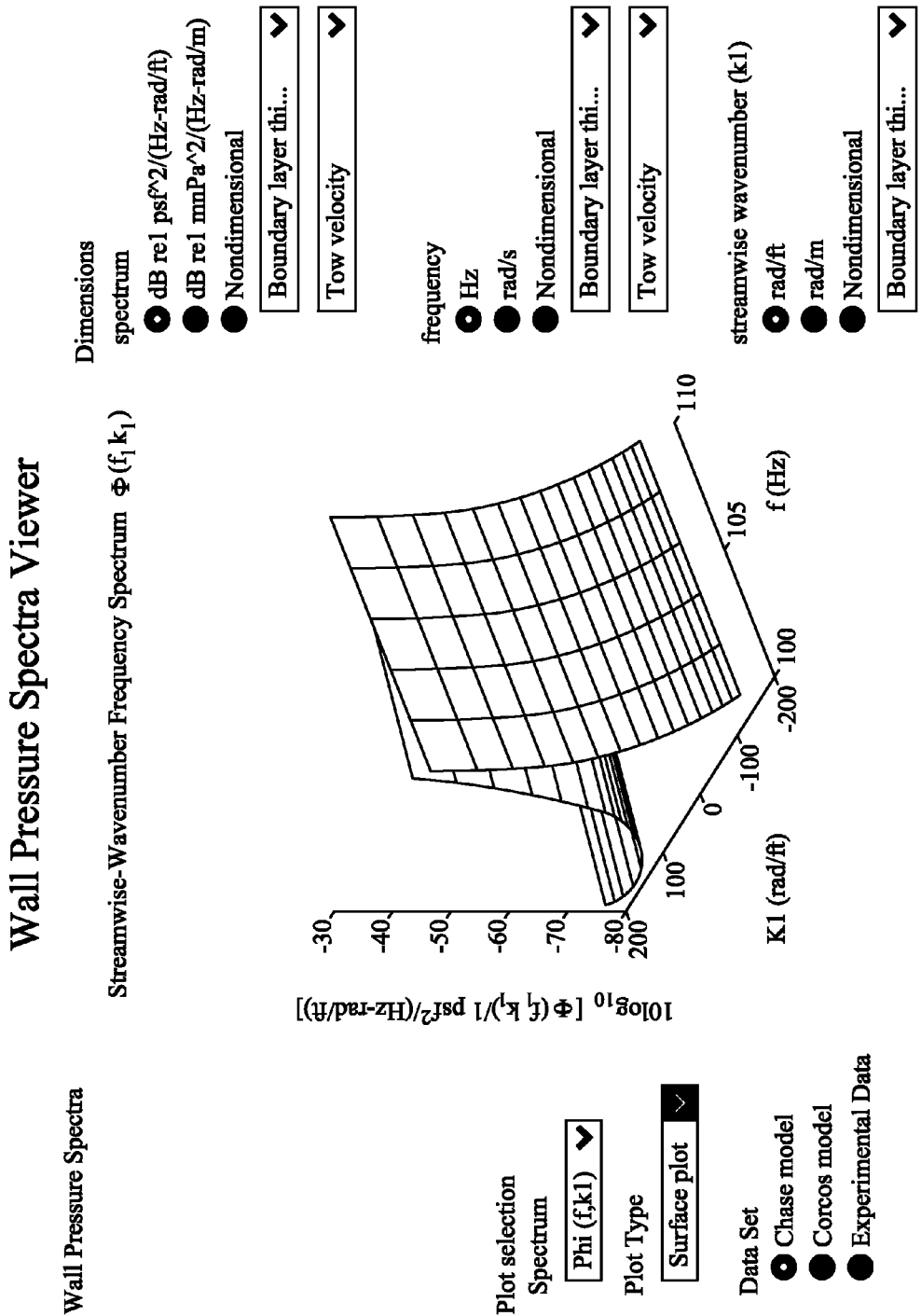
FIG. 5 is an image of a region of a computer display screen on which is displayed a Wall Pressure Spectra Viewer GUI, according to principles of the present invention.

Predictions generated by the GUI can be viewed in the GUI shown in FIG. 5. The user can also upload experimental results in order to directly compare the predictions and experimental results on the same plot. The data can be displayed using a variety of two-dimensional and three-dimensional plot types.

Within the GUI, the user selects the data sets of interest and the desired plot type for displaying the data. The user also selects the units (English, metric, or non-dimensional) in which to display the data. The plotted data can be exported to a spreadsheet and the image of the plot can be captured and saved.

System Operation

Using the Wall Pressure Spectra Generator GUI (shown in FIG. 4) the user supplies the fluid properties and boundary layer parameters defining the flow field. The user also prescribes the wavenumber and frequency bandwidths of interest and the semi-empirical constants used in the mathematical models for the pressure spectra. To predict a sensor array response to the prescribed flow field, the user may also define a one-dimensional or two-dimensional array configuration (e.g., a number of sensors that are used and their spacing in the streamwise and spanwise directions) and sensor specifications (e.g., shape and length scale).

When the desired parameters have been entered, the user activates the 'Make Predictions' button of the GUI which causes the computer to execute the numerical integration mathematical process; thereby, generating the predictions.

Predictions generated by the GUI can be viewed as shown in FIG. 5. The user can also upload experimental results in order to directly compare the predictions and experimental results on the same plot. Using the GUI, the user selects the data sets of interest and the desired plot type for displaying the data. The user also selects the units in which to display the data. The plotted data can be exported to a spreadsheet which can be stored in readable memory. The image of the plot can be captured and saved to memory.

The system provides the following advantages. The system enables a streamlined process that runs efficiently on computers and provides interactive graphics. A detailed knowledge of the semi-empirical models embedded in the system is not required in order to use the system. The system provides straightforward implementation of on-going results from finite element structural analysis and new types of acoustic sensors.

The system also provides an analysis of the spanwise distribution of energy in the spectra. The system further provides the ability to determine the entire energy containing frequency bandwidth. Furthermore, the system provides a growing database of cases available for comparison. The features of the GUI are now described in great detail. When the verb "point" in any of its variants is used (the meaning is that a pointing device such as a mouse, or a computer touchscreen) is activated to indicate a location on a screen and to activate a button so as to indicate the selection of an action or a choice that is displayed at the location.

In order to perform operations (such as numerically predicting the spectrum of the energy beneath a turbulent boundary layer flow over a flat plate due to wall pressure fluctuations); one performs the steps of opening the WPS Generator, entering parameters, and activating the system to make predictions through the GUI.

Opening the Generator

In order to open the WPS generator, one locates the WPS generator m-file in a memory connected to the computer. This can be performed by using a command line system, a graphical operating system, or any other system that allows the file location to be accessed.

The generator may be opened from the command window: by entering WPSgui on the command line from an open WPS Generator window Under the File menu, select New WPS Generator; or from an open WPS Viewer window. Under the Predictions menu, select Generate new prediction.

Entering Parameters

Wall pressure spectra predictions can be made for a variety of fluids, flow conditions, and sensor configurations. These parameters are specified in the GUI window.

Dimensions

The user may choose to work in either English or metric units. To select dimensional units, one selects the Dimensions menu and chooses either English or Metric. The selected units will be denoted with a check mark.

Parameters

The parameters that can be changed to include fluid properties, boundary layer properties, sensor configurations, frequency settings, Corcos model parameters, and Chase model parameters as provided in the tables that follow.

| FLUID PROPERTIES | | | |
|---|---|---|---|
| NAME | Units, English (metric) | Data type | Description |
| fluid | — | string | Name ascribed to fluid (e.g. 'water', 'air') |
| density | Slug/ft³ (kg/m³) | float | Fluid density, $\rho$ |
| Kinematic visocosity | ft²/s (m²/s) | float | Kinematic viscosity, v is the ratio of viscous and inertial forces, or dynamics viscosity over density, $\mu/\rho$ |

| BOUNDARY LAYER PROPERTIES | | | |
|---|---|---|---|
| Name | Units, english (metric) | Data Type | Description |
| Flow velocity | ft/s (m/s) | float | Mean stream velocity, $U_o$ |
| Friction velocity | ft/s (m/s) | float | Friction velocity, $u_\tau$ |
| Boundary layer thickness | in (cm) | float | Boundary layer thickness, $\delta$ |
| Displacement thickness | in (cm) | float | Displacement thickness, $\delta^*$ |
| Momentum thickness | in (cm) | float | Momentum thickness, $\theta$ |

| SENSOR CONFIGURATIONS | | | |
|---|---|---|---|
| Name | Units, English (metric) | Data type | Description |
| # of streamwise sensors | — | integer | Number of sensors oriented in the streamwise direction |
| # of spanwise sensors | — | integer | Number of sensors oriented in the spanwise direction |
| Sensor diameter | in (mm) | float | Diameter of sensors; enter '0' to stimulate . . . |
| Streamwise spacing | in (mm) | float | Spacing between sensors in the streamwise direction, as measured from center to center |
| Spanwise spacing | in (mm) | float | Spacing between sensors in the spanwise direction, as measured from center to center |

| FREQUENCY SETTINGS | | | |
|---|---|---|---|
| NAME | UNITS | DATA TYPE | DESCRIPTION |
| Min | Hz, $\omega\delta^*/U_o$ | float | Minimum frequency of interest |
| Max | Hz, $\omega\delta^*/U_o$ | float | Maximum frequency of interest |
| Step size | Hz, $\omega\delta^*/U_o$ | float | Size of interval between discrete frequencies at which energy is calculated over frequency range (Min to Max) |
| # of steps | — | integer | Number of discrete frequencies over frequency range (Min to Max) at which energy is calculated |

| CORCOS MODEL PARAMETERS | |
|---|---|
| Name | Description |
| a1 | |
| a2 | |
| a3 | |
| a4 | |
| b1 | |
| b2 | |
| b3 | |
| b4 | |
| b5 | |
| b6 | |
| b7 | |
| b8 | |

(Note: All parameters are dimensionless floats)

| CHASE MODEL PARAMETERS | |
|---|---|
| Name | Description |
| b | |
| hc | |
| ct | $c_t$ |
| cm | $c_m$ |

(Note: All parameters are dimensionless floats)

Loading Parameters

One can reload parameters used previously to make predictions. To do so, one selects "File>Load" parameters, and one chooses a file having a ".mat" extension for a previously-generated prediction. By default, the most recently run parameters are held in a file called Last WPSGen.mat Making Predictions One chooses a destination file for the prediction. One may manually enter a file path and name into the "Save to file" text box, or one may browse for a file. Once the desired parameters have been entered and the destination file is assigned, one activates the "Make Prediction" button. This instruction saves the currently entered parameters to Last "WPSgen.mat"; causes the execution of the prediction generation mathematics contained within WPScalc; and causes the system to display the completed prediction in the Wall Pressure Spectra Viewer window (WPSplotgui).

The GUI comprises three main mathematical processes. One process accepts user inputs defining a turbulent flow field and wall pressure sensor arrangement and manipulates these data in preparation for calculations. A second process performs the mathematical calculation of the wall pressure spectra for a given flow field and sensor arrangement. A third process displays the calculated spectra as selected by the user and can display experimental data imported from another source or entered by a user.

The first mathematical process, coded as the MATLAB® program WPSgui.m in the embodiment described, involves a graphical user interface (GUI) called the 'Wall Pressure Spectra Generator', that accepts the values of the parameters defining a flow field and sensor arrangement. The mathematical process comprises the following components.

A set of instructions is provided that accept user inputs for test parameters. The user inputs include the following information: fluid name, density, kinematic viscosity, free stream velocity, friction velocity, boundary layer thickness, displacement thickness, momentum thickness, number of streamwise sensors, number of spanwise sensors, sensor diameter (circular sensor)/length and width (rectangular sensor), streamwise sensor spacing, spanwise sensor spacing, dimensional frequency minimum, dimensional frequency maximum, dimensional frequency bin width, number of bins in frequency, dimensionless frequency minimum, dimensionless frequency maximum, dimensionless frequency bins size, Corcos model parameters ($a_1$-$a_4$, $b_1$-$b_8$), and Chase model parameters (b, $h_c$, $C_T$, $C_M$).

If a free stream velocity is entered; the corresponding values of friction velocity and dimensionless frequencies are recalculated. If a friction velocity is entered, the corresponding values of free stream velocity and dimensionless frequencies are recalculated. If a boundary layer thickness is entered, the corresponding values of displacement thickness, momentum thickness, and dimensionless frequencies are recalculated. If a displacement thickness is entered, the corresponding values of boundary layer thickness, momentum thickness, and dimensionless frequencies are recalculated. If a momentum thickness is entered, the corresponding values of boundary layer thickness, displacement thickness, and dimensionless frequencies are recalculated. If a new minimum or maximum frequency or dimensionless frequency is entered, or a new dimensional or dimensionless frequency bin width or number of bins is entered, the dimensional and dimensionless frequency ranges are recalculated.

Upon completion of data entry, the following steps take place. The user inputs are saved to a file which can be reloaded into the program. User inputs are converted to English units for calculation (if necessary). The user inputs are then passed to WPScalc (which is a mathematical process detailed below). Upon successful execution of WPScalc, a record is created that details input parameters and the time and date at which the program was executed. Upon successful execution of WPScalc, the program WPSplotgui (a mathematical process detailed below) is executed.

The second mathematical process, coded as the MATLAB® program WPScalc.m in the embodiment described, executes the calculation of the wall pressure spectra for a given flow field and sensor arrangement. The mathematical process operates according to the following steps.

User defined parameters are loaded. Spanwise and streamwise wavenumber convolution ranges and intervals are calculated using the user-defined frequency band of interest. The breadth and absolute value of the frequency band of interest determines the specific intervals of wavenumber convolution necessary to resolve the convective ridge at the frequencies of interest. Streamwise and spanwise wavenumber bandwidth range and intervals are calculated from the user-defined number and spacing of sensors. For zero or one sensors cases (in one or two dimensions), wavenumber bandwidth range and interval is taken as the computed range and interval of convolution. All solution arrays are pre-allocated.

At each (user-defined) bin in frequency; the following steps are performed; convection velocity and convective wavenumber are calculated; autospectral-level is estimated; and the solutions of both Chase's and Corcos' models for wall pressure fluctuations are computed over the streamwise and spanwise wavenumber convolution ranges. Spatial averaging effects due to the user-prescribed sensor size and shape are taken into account in these solutions. Integration over the convolution range then occurs in the spanwise and streamwise direction as necessary (i.e., when two or more sensors are being modeled in one or both directions).

Both Chase's and Corco's solutions are integrated over the spanwise convolution range and the streamwise convolution range. Both solutions are integrated over frequency (f), streamwise wavenumber ($k_1$), and spanwise wavenumber ($k_2$) to yield solutions for six spectra: $\Phi(f,k_1)$, $\Phi(f,-k_2)$, $\Phi(k_1,-k_2)$, $\Phi(f)$, $\Phi(k_1)$, $\Phi(k_2)$. All twelve solutions are converted to units of $dB//psf^2/(Hz\text{-}rad/ft)$, $dB/psf^2/(rad/ft)^2$, $dB//psf^2/(Hz)$ or $dB//psf^2/(rad/ft)$, as dimensions dictate. All data are saved to a file.

The third mathematical process, which is coded as the MATLAB® program WPSplotgui.m in the present embodiment, is described as a GUI called the 'Wall Pressure Spectra Viewer'. This process accepts both the solutions generated by WPScalc as well as experimental spectral data. The WPSplotgui.m mathematical process comprises the following steps.

The user loads the desired data set (newly computed solutions are automatically loaded when called from WPSgui). The user selects which data set (of the six possible spectra $\Phi(f,k_1)$, $\Phi(f,k_2)$, $\Phi(k_1,k_2)$, $\Phi(f)$, $\Phi(k_1)$, $\Phi(k_2)$) to view. The GUI displays choices for plot-type based on selected data set. The GUI displays/prompts for appropriate user input of fixed frequency or fixed wavenumber based on plot type selection. The GUI automatically adjusts user input to coincide with existing frequency or wavenumber bins in data set (e.g. rounding to nearest bin). The GUI displays appropriate choices of dimensions based on the selected data set. The GUI displays appropriate choices for dimensionless scaling parameters based on the selected data set and plot type.

The GUI displays an appropriate solution set (Chase's prediction, Corcos' prediction, or other loaded experimental data) choices based on the data set and plot type selected. The user can toggle plot legends on and off. The GUI updates the plot and the legend when the user changes the selected data set; the plot type, a fixed frequency (or wavenumber), a solution set, or dimensions. The user can save the displayed plot as an image file. The user can write data to file as displayed, i.e., writing only that subset of all available data (all data sets of all solutions sets) which is currently displayed and retaining currently selected dimensions.

The GUI can be updated to include an analysis of boundary layer control techniques such as polymers, large eddy breakup devices, riblets, suction and injection of fluid, or other surface treatments. Additional theoretical models can be readily implemented.

The fluctuating wall shear stress field is an additional physical quantity which could be built into the GUI. The GUI could also be interfaced with structural vibration computations; thereby, providing a solution for the turbulent forcing of a fluid structure interface.

Figure 6:
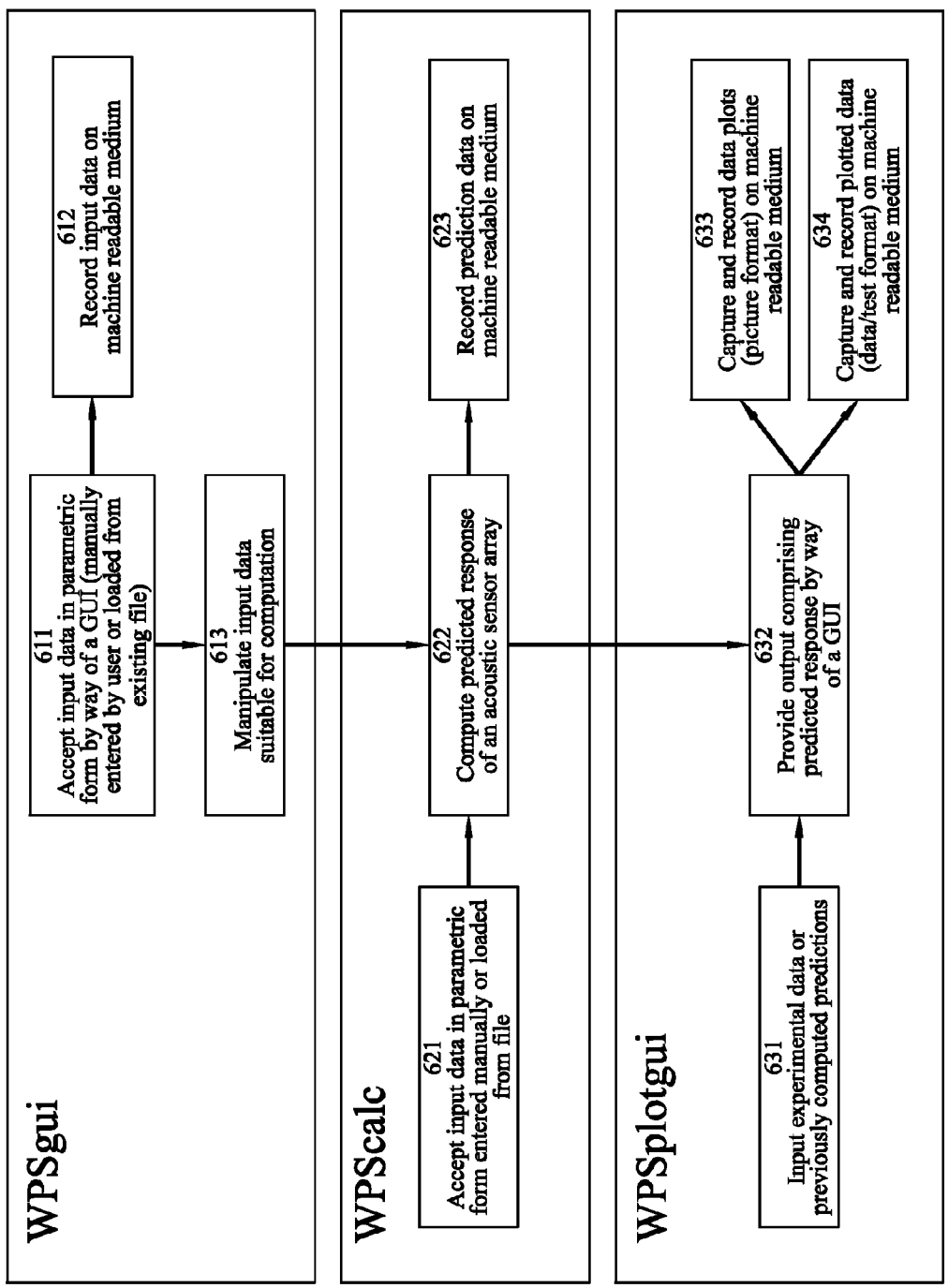
FIG. 6 is a flow diagram of a computer-based method for analyzing wall-pressure fluctuation measurements in an acoustic array according to the principles of the present invention.

FIG. 6 is a flow diagram of a computer-based method for analyzing wall-pressure fluctuation measurements in an acoustic array according to the principles of the present invention. In FIG. 6, at step 611, input data is accepted in parametric form by way of the GUI. This data is either newly entered by the user or loaded by the user from an existing file. At step 612, input data is recorded. At step 613, input data is manipulated to a form suitable for computation. In lieu of steps 611, 612, and 613; parametric input data can be manually entered or loaded from a file directly without a GUI (step 621).

At step 622, a predicted response of an acoustic sensor array is computed. At step 623, the prediction data is recorded. At step 632, output comprising the predicted response is provided by way of a GUI. At step 631, experimental data or other predicted results are optionally input for display in comparison with predicted data by way of the GUI. At step 633, the image of the displayed plot is captured and recorded. At step 634, the data currently being displayed is captured and recorded.

DEFINITIONS

Recording the results from an operation or data acquisition, such as, recording results at a particular frequency or wavenumber, is defined herein as writing output data in a non-transitory manner to a storage element, to a machine-readable storage medium, or to an alternate storage device.

Many functions of electrical and electronic apparatus can be implemented in; hardware (for example, hard-wired logic), in software (for example, logic encoded in a program operating on a general purpose processor), and in firmware (for example, logic encoded in a non-volatile memory that is invoked for operation on a processor as required).

The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct; the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for analyzing wall-pressure fluctuation measurements in an acoustic array, said apparatus comprising:
    a plurality of piezoelectric pressure sensors mounted in streamwise and spanwise directions at a fluid-solid interface of the acoustic array;
    a general purpose programmable computer responsive to measurements of said sensors with said computer configured to operate under the control of instructions, the instructions when operating providing;
    a graphical user interface configured to accept data in parametric form and to accept data obtained by the response of the acoustic array and representing a fluid property, boundary layer parameters that define a flow field, a wavenumber and a frequency bandwidth, and semi-empirical constants used in mathematical models for the pressure fluctuations, with said interface configured to manipulate the data to a form suitable for computation, and configured to record the data in non-volatile form, the data recorded in at least one form selected from the group consisting of the parametric form and the form suitable for computation;
    a computational component configured to accept the data and to compute according to a numerical integration mathematical process, a predicted response of wall pressure spectra of the acoustic array to a user-defined flow field as an output, and configured to record as output data as a result of the computation in non-volatile form; and
    a display configured to receive as input the predicted response of the acoustic array to the user-defined flow field, and to provide as output the predicted response, wherein the predicted response is provided in at least one manner selected from the group consisting of displaying the output to be viewed, recording the output, and transmitting the output and to provide as output the data obtained by measurement for comparison with the predicted response.

2. The apparatus of claim 1, wherein said display is configured to provide output in a form selected from the group consisting of output in English dimensions, output in metric dimensions, and output in non-dimensional form.

3. The apparatus of claim 1, wherein said computational component is configured to read in as input data information previously-recorded in an input data file.

4. A method for analyzing wall-pressure fluctuation measurements in an acoustic array, said method comprising the steps of:
    providing a plurality of piezoelectric pressure sensors mounted in streamwise and spanwise directions at a fluid-solid interface of the acoustic array;
    providing a general purpose programmable computer with a graphical interface capable of accepting user-selected instructions and the programmable computer configured to operate under the control of computer instructions;
    acquiring measurements of the acoustic array with the measurements representing a fluid property, a boundary layer parameter that defines a flow field, a wavenumber and a frequency bandwidth, and semiemperical constants used in mathematics for pressure fluctuations;
    obtaining input data by said acquiring step;
    accepting the input data in parametric form by way of a with the graphical user interface;
    manipulating the input data in parametric form to a form suitable, for computation;
    recording the input data in non-volatile form, the input data recorded in at least one form selected from the group consisting of the parametric form and the form suitable for computation;
    computing a predicted response of wall pressure spectra according to a numerical integration mathematical process of the acoustic array to a user-defined flow field as an output;

recording as output data the result of the computation in non-volatile form providing the predicted response as output through the graphical user interface, wherein the predicted response is provided in at least one manner selected from the group consisting of displaying the output to be viewed, recording the output, and transmitting the output; and providing as output the data obtained by said acquiring step for comparison with the output of the predicted response.

5. The method of claim 4, wherein said step of providing the predicted response as output comprises providing output in a form selected from the group consisting of output in English dimensions, output in metric dimensions, and output in non-dimensional form.

6. The method of claim 4, wherein said step of accepting input data in parametric form further comprises reading in as input data information previously recorded in an input data file.

* * * * *